United States Patent [19]

Hutchison

[11] Patent Number: 4,477,106

[45] Date of Patent: Oct. 16, 1984

[54] CONCENTRIC INSULATED TUBING STRING

[75] Inventor: S. O. Hutchison, Bakersfield, Calif.

[73] Assignee: Chevron Research Company, San Francisco, Calif.

[21] Appl. No.: 431,872

[22] Filed: Sep. 30, 1982

Related U.S. Application Data

[63] Continuation of Ser. No. 182,364, Aug. 29, 1980, abandoned.

[51] Int. Cl.³ .............................................. F16L 59/16
[52] U.S. Cl. ...................................... 285/47; 285/53; 138/149
[58] Field of Search .................... 285/53, 47, DIG. 5, 285/133 A; 138/149

[56] References Cited

U.S. PATENT DOCUMENTS

| | | | |
|---|---|---|---|
| 1,140,633 | 5/1915 | Trucano | 285/47 |
| 2,924,245 | 2/1960 | Wilson | 29/157 R X |
| 2,980,451 | 4/1961 | Taylor et al. | 285/332.3 |
| 3,275,345 | 9/1966 | Waldron et al. | 285/47 |
| 3,369,826 | 2/1968 | Boosey et al. | 285/47 |
| 3,371,946 | 3/1968 | Bleyle, Jr. et al. | 285/47 |
| 3,511,282 | 5/1970 | Willhite et al. | 285/47 X |
| 3,574,357 | 4/1971 | Alexandro | 285/47 |
| 3,794,358 | 2/1974 | Allen et al. | 285/47 |
| 3,850,714 | 11/1974 | Adorjan | 285/47 X |
| 4,025,091 | 5/1977 | Zeile, Jr. | 285/53 |
| 4,054,158 | 10/1977 | Hoeman et al. | 285/47 X |
| 4,130,301 | 12/1978 | Dunham et al. | 285/47 |
| 4,332,401 | 6/1982 | Stephenson et al. | 285/53 X |
| 4,340,245 | 7/1982 | Stalder | 285/53 |

Primary Examiner—Thomas F. Callaghan
Attorney, Agent, or Firm—G. W. Wasson; Edward J. Keeling; L. S. Gruber

[57] ABSTRACT

An improved insulated tubing string with insulated coupling formed of concentric tubing members insulated from each other to prevent heat from the inner tubing from being conducted to and through the outer tubing. The coupling joins the outer tubing of successive tubing assemblies to provide additional strength to the string and the inner tubing is insulated within the coupling to prevent heat loss at the coupling. The inner tubing is elongated during fabrication and joined to the outer tubing when elongated to reduce heat stress on the string when in use.

11 Claims, 6 Drawing Figures

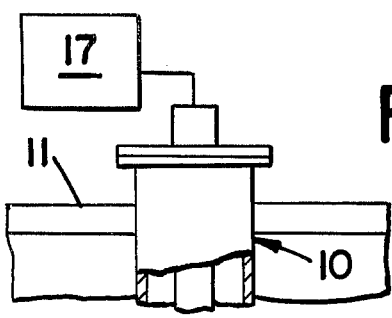
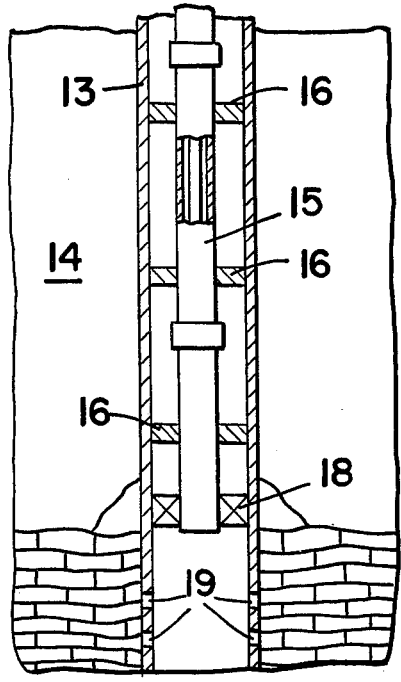
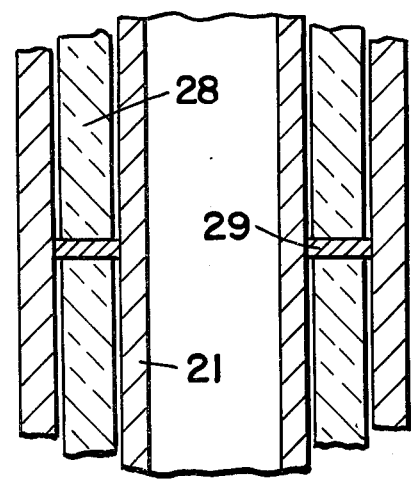
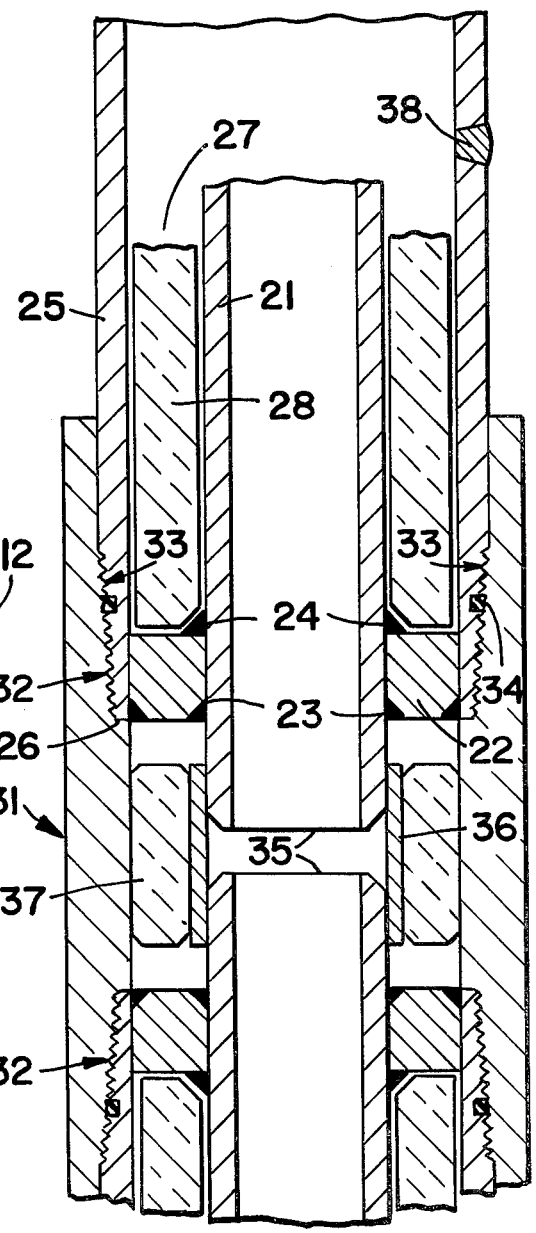
FIG_1
FIG_3
FIG_2

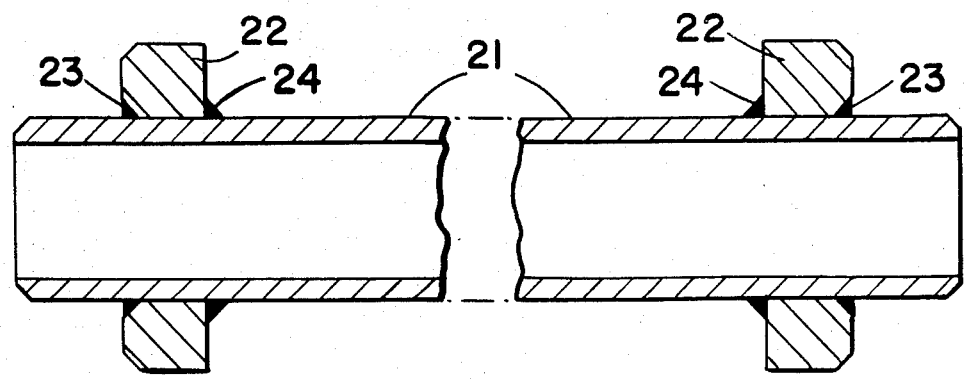
FIG_4
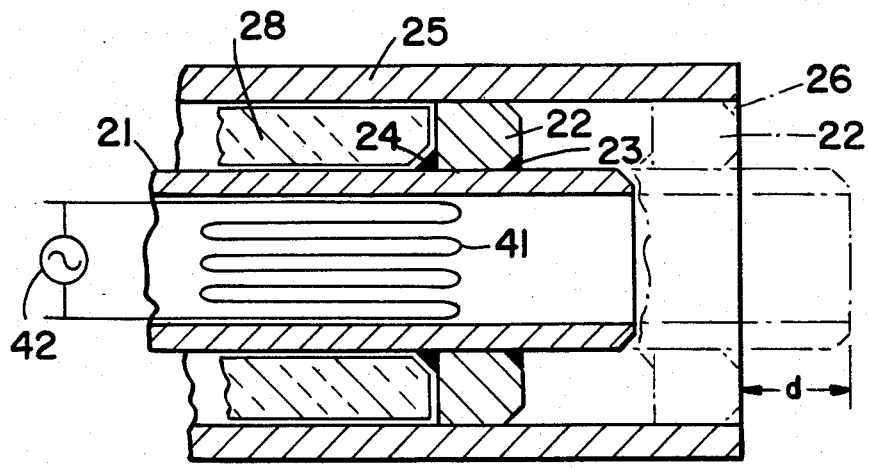
FIG_5
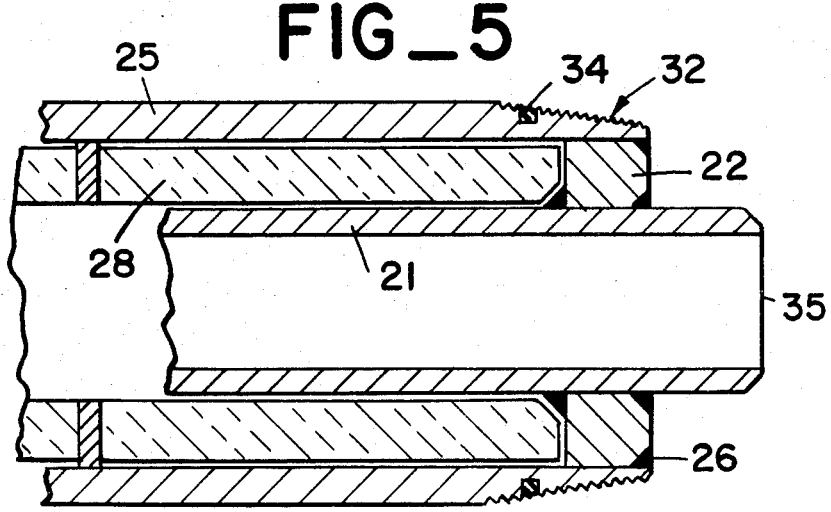
FIG_6

CONCENTRIC INSULATED TUBING STRING

This is a continuation of application Ser. No. 182,364, filed Aug. 29, 1980, and now abandoned.

BACKGROUND OF THE INVENTION

When steam flooding a subsurface petroleum-containing formation, steam is usually generated at the earth's surface and injected into the subsurface formation from a cased well. The steam is usually transported to the producing formation through a conduit run inside the casing within the well. In a successful steam flood operation, the injection of steam into the target formation is maximized, while the loss of heat from the steam as it is transported from the surface to the target formation through the well conduit is minimized. Thermal insulation between the steam carrying conduit and the formation has been proposed as a means for reducing heat loss from the steam conduit to the formation. The construction of insulated conduit sections and the joining of sections of such insulated conduit into a concentric insulated tubing string is the subject matter of this invention.

PRIOR ART

Prior art systems have disclosed both preinsulated conduit sections and the application of insulation to the conduit after the conduit has been run into a well.

The application of insulation in place has the disadvantage of being uninspectable, both for initial application and subsequent failure. One form of application of insulation in place is shown in U.S. Pat. No. 3,525,399.

In prior art preinsulated conduits, concentric string conduits have been proposed with insulating materials positioned between concentric tubing sections. Such prior art concentric tubing sections have included several schemes for construction including schemes for accommodating a difference in thermal elongation of the steam conduit with respect to the insulated conduit of the concentric tubing. Concentric tubing for injection into or production from a subsurface formation is shown in U.S. Pat. Nos. 3,608,640 and 3,680,631 and is available from General Electric Company in a product sold under the tradename of "Thermocase III".

SUMMARY OF THE INVENTION

The prior art concentric insulated tubing conduits or strings have been inefficient in field use where steam flooding has been the objective because of heat loss at the coupling between sections of conduits. A coupling used to join the adjacent sections of conduit becomes heated to substantially the same temperature as the conduit carrying the steam and the coupling then is a source of heat loss.

One of the prior art conduits provides threaded ends at each end of the internal tubing of the conduit sections and a coupling joining the internal tubing. The coupling of sections by threads on the internal tubing places excessive tension strain on the assembled injection conduit. Mechanical failure and excessive heat loss at such coupling joints has been observed.

The present invention proposes an insulated, concentric tubing, steam injection (or production) conduit wherein the conduit is assembled from sections of concentric insulated tubing with a coupling that joins the sections together at threaded portions on the exterior of the outer tubing. The coupling is adapted to insulate the inner tubing against heat loss as sections of the concentric tubing are joined together.

Individual concentric tubing sections are manufactured by a procedure that establishes an isolated space between the outside of the inner tubing and the inside of the outer tubing. The inner tubing is elongated by heat expansion prior to being attached to and insulated from the outer tubing. The outer tubing is then dressed and threaded for cooperation with an external coupling.

The coupling joining tubing sections provides insulation at the joint and mechanical strength for an assembled string.

The objects and features of the present invention will be readily apparent to those skilled in the art from the appended drawings and specification illustrating a preferred embodiment.

BRIEF DESCRIPTION OF THE DRAWINGS

FIG. 1 is a sectional view through an earth formation illustrating the apparatus of the present invention in use.

FIG. 2 is a sectional view of the apparatus of the present invention showing the coupling of two sections of insulated concentric tubing conduit.

FIG. 3 is a sectional view of the apparatus of the present invention intermediate the ends showing the insulation and spacing between concentric tubing.

FIG. 4 is a sectional view of the inner tubing prior to its attachment to the outer tubing.

FIG. 5 is a sectional view of the inner and outer tubing prior to heat expansion.

FIG. 6 is a sectional view of the end of an assembled insulated concentric tubing section.

FIG. 1 is a sectional view through an earth formation illustrating the present invention in its installed position within a cased well. As illustrated, a well 10 is drilled from the earth's surface 11 to an oil-bearing formation 12. A typical oil-bearing reservoir to which the present invention has application includes a formation containing viscous crude oil which cannot be produced to the earth's surface under formation pressure and temperature. A technique for stimulating the production of a viscous crude oil from such a subsurface oil reservoir is to inject steam into that reservoir through a steam injection well to heat the oil and reduce its viscosity. As herein illustrated, the injection well includes a metal casing 13 passing through the formation 14 to the subsurface horizon of the formation 12. A steam projection conduit 15 is positioned inside the casing 13 and spaced by suitable spacing means 16 to conduct steam from a surface steam generating source 17 to the subsurface formation 12. A packer 18 is usually provided at the downhole end of the steam conduit 15 to prevent steam from flowing back up the annulus between the conduit and the casing. The casing is perforated, as at 19, at the location of the oil-bearing formation to provide conduits into and out of the permeable oil-bearing formation.

FIGS. 2 and 3 illustrate in sectional form the construction of the concentric tubing steam injection conduit as illustrated generally in FIG. 1. It should be understood that FIG. 2 illustrates the adjacent ends of two concentric tubing sections adjoined by a coupling means so as to produce a continuous portion of a steam injection conduit or string of the type illustrated in FIG. 1. Each of the individual concentric tubing conduit sections is made up of an inner tubing 21 having an annular end member 22 secured to the exterior surface of the inner tubing, as by being welded thereto at 23 and 24. The outer surface of the annular member 22 is secured to the inner surface adjacent to the end of an outer tubing section 25. The connection between the annular end member 22 and the outer tubing 25 is established by welding the end of the annular member, as at 26, to the end of the outer tubing section.

The annular space 27 between the outside of the inner tubing and the inside of the outer tubing is filled with an insulating material 28. The insulating material may be formed of tubular sections which are inserted over the outside of the inner tubing when the inner tubing is inserted into the outer tubing. The tubular sections of insulating material may be split longitudinally to fit around the inner tubing during assembly.

Between sections of the insulating materials, ring-like spacers 29, shown in FIG. 3, are provided to maintain positioning of the insulating material 28 and to prevent the collapse of the outer tubing onto the insulation and inner tubing, thus destroying the insulating qualities of the insulation material.

As particularly shown in FIG. 2, individual sections of the concentric tubing string are joined together by a coupling member generally designated 31. The coupling is a hollow cylindrical form with female threads on the inside of each end thereof at 32. The ends of the outside tubing 25 of the concentric tubing string are threaded with male threads at 33 to match with the internal threads of the coupling. Both of these threads are conventional oil field pipe threads being tapered to provide a wedge tightening for the coupling. A sealing ring 34 is positioned in the grooves cut into the interior of the coupling and the exterior of the outer tubing to provide both sealing and protection for the mating of the two threads. The inner tubing 21 of the concentric string 15 extends beyond the threaded end of the outer tubing 25, as at 35, and is adapted to be fitted with a deflector ring 36. An insulating hollow cylinder 37 surrounds the deflector ring 36 and encloses the ends of the extension of the inner tubing to insulate the coupling from the hot fluid which may be pumped down through the inner conduit.

When assembled in the form as shown in FIG. 2, the two sections of concentric tubing string may form a portion of the overall string extending through the earth formation to carry hot fluids, or steam, through the inner conductor in a manner to insulate the temperature of the inner tubing from the outer tubing. To further improve the insulation characteristic of the space between the inner tubing and the outer tubing, the remaining space may be filled with an inert gas having low heat carrying characteristics. For that purpose, the outer tubing may be provided with a plug member 38 through which the insulating gas may be pumped.

FIGS. 4, 5 and 6 illustrate a preferred manner for constructing the concentric tubing string of the present invention. As illustrated in FIG. 4, the inner tubing 21 is first provided with an annular end member 22 at each end and the inside surface of each end member 22 is welded at 23 and 24 to the outside surface of the inner tubing 21 to establish complete sealing of the annular member against the outer surface of the inner tubing. The inner tubing 21 is then inserted into the outer tubing 25 as shown in FIG. 5 and insulating material 28 is installed to surround the inner tubing as the tubing is inserted into the outer tubing. For that purpose, the cylindrical insulation may be in the form of a split cylinder to permit it to be placed around the inner tubing as the inner tubing is inserted. The spacer members 29 also are placed around the inner tubing 21 between adjacent insulation sections. The spacers may be formed as split rings to permit them to be assembled around the inner tubing.

After a concentric tubing section has been assembled as described, a heating element 41 connected to an energy source 42, as schematically illustrated in FIG. 5, is placed within the interior of the inner tubing to heat it along its entire length. While FIG. 5 illustrates a short portion only of the heating element, it should be understood that it is preferred that the entire length of the inner tubing within the outer tubing is heated. As the inner tubing becomes heated, it expands in length. If one end of the inner tubing is held in place with respect to the outer tubing, by clamping or by having first been welded thereto, as at 26, the other free end of the inner tubing will expand axially to extend toward the other end of the outer tubing. When the inner tubing has been expanded to a desired length, the outer surface of the annular end member 22 at the free end is welded at 26 to the inner surface of the outer tubing. In the welded position, the inner tubing extends a predetermined distance, shown as d in FIG. 5, beyond the end of the outer tubing. If the fixed end of the inner tubing had only previously been clamped to the outer tubing, that end is then also welded, as at 26, to the inside of the outer tubing.

When the welding between the annular end member 22 and the outer tubing 25 is completed to securely fasten the inner and outer tubing sections together, the inner tubing is in an elongated condition and the heating element is then withdrawn permitting the inner tubing member to cool. When cooled, the inner tubing is placed in tension as it attempts to contract but it is maintained at its elongated length by its connection at both ends to the inner surface of the outer tubing. As shown in FIG. 6, the end of the outer tubing is then dressed and the male threads 32 are cut into the outer surface. The slot accomodating the sealing ring 34 is then machined and the section of concentric tubing is available for assembly with other tubing sections.

Because of the manner in which the concentric tubing sections have been fabricated, placing the inner member in tension when in cooled condition but in relaxed (expanded) condition when in heated condition, and because of the insulation between inner and outer tubings, the assembled concentric tubing string of the present invention provides a conduit for the conduction of hot fluids with minimized heat loss and with reduced coupling stress. A particular feature of the present invention is that the joint between successive sections of the concentric tubing strings is formed by coupling the outer tubing of each of the members, thus providing additional strength to the overall concentric tubing. With the construction here described, the outer tubing may be made of heavier gauge pipe capable of supporting greater weight in the assembled tubing string. Also, because the fabricated sections are substantially unstressed at operating temperature, the assembled tubing string is less likely to fail due to fatigue. When assembled with the coupling, as shown in FIG. 2, the entire string of concentric tubing sections is substantially completely insulated from the earth formation and the interior of the casing, thus reducing the heat loss in transporting the hot fluids or steam through the subsurface formation. When the steam has been carried to the horizon where the oil-bearing formation is found, the steam may be forced out of the end of the tubing string and into the formation 12 through the perforations 19 with the packing gland 18 preventing steam from passing up through the annulus around the tubing string and inside of the casing.

While a certain preferred embodiment of the invention has been specifically disclosed, it should be understood that the invention is not limited thereto as many variations will be readily apparent to those skilled in the art and the invention is to be given its broadest possible interpretation within the terms of the following claims.

What is claimed is:

1. In apparatus for conducting hot fluid in a subsurface earth formation through a well bore penetrating said earth formation the improvement comprising:
   a concentric insulated tubing string including,
   a prestressed, heat elongated inner tubing for conducting said hot fluid,
   an outer tubing surrounding said inner tubing and establishing an annular volume space between the inside of said outer tubing and the outside of said inner tubing,
   insulating means in said annular volume space,
   substantially rigid ring like spacer means positioned along said apparatus in said annular volume space,
   annular end members first secured to the outer surface of said inner tubing adjacent to the ends thereof and then secured to the inner surface of said outer tubing adjacent to the ends thereof at locations along said outer tubing where said heat elongated inner tubing aligns said end members,
   threads cut into the outer surface of said outer tubing at each end thereof adjacent to the location where said end members are secured to the inner surface of said outer tubing thus forming individual sections of concentric inner and outer tubing,
   coupling members having internal threads matching said threads cut into the outer surface of said outer tubing to permit said individual sections to be joined to form said apparatus,
   and an annular insulating member within said coupling including deflector means engaging and enclosing adjacent ends of said inner tubings.

2. A coupling for insulated concentric tubing sections for conducting hot fluids wherein the inner tubing of said concentric tubing is first elongated by thermal expansion and then attached to the inner surface of the outer tubing of said concentric tubing when elongated, said inner tubing being insulated from said outer tubing by an insulating annular volume space between said inner and outer tubing, said coupling comprising:
   a threaded coupling member having female threads at each end engaging male threads on the outer surface of the ends of said outer tubing of concentric tubing sections to be joined,
   an annular deflector means positioned over the extending ends of said inner tubing in concentric tubing sections to be joined,
   and an annular insulating member between said annular deflector means and the inner surface of said coupling member,
   whereby adjacent sections of said concentric tubing are joined by said threaded coupling member joining said outer tubing.

3. An improved prestressed conduit string for conducting heated fluids through a well bore, said conduit string being comprised of:
   a plurality of connected-together conduit sections, each conduit section comprising:
   an elongated large diameter outer tube positioned around a smaller diameter conductor tube, said outer tube being shorter than said conductor tube and being positioned with respect thereto whereby the ends of said conductor tube extend beyond the ends of said outer tube short equal distances; and
   bushing means positioned at the ends of said outer tube between said outer tube and said conductor tube, said bushing means being fixedly attached to said outer tube and to said conductor tube whereby said conductor tube is in tension prestress and said outer tube is in compression prestress;
   said conduit sections being connected together in end-to-end relationship to thereby form said conduit string by connector means, each of said connector means comprising:
   annular insulation means positioned around axially aligned adjacent extending ends of said conductor tubes and between adjacent bushing means of adjacent conduit sections;
   coupling means positioned around said insulation means and connected to the outer tubes of said adjacent conduit sections thereby rigidly connecting said conduit sections together; and
   seal means positioned between said coupling means and said outer tubes of said adjacent conduit sections thereby forming a heat insulated sealed joint between said adjacent conduit sections.

4. The conduit string of claim 3 wherein said conductor tubes and said outer tubes of each of said conduit sections are positioned concentrically with respect to each other.

5. The conduit string of claim 4 wherein each of said conduit sections is further characterized to include one or more annular spacer members positioned between the conductor tube and outer tube thereof and between said bushing means thereof.

6. The conduit string of claim 1 wherein said bushing means of each of said conduit sections are welded to said conductor tube and outer tube thereof and said coupling means are threaddedly connected to said outer tubes of said adjacent conduit sections.

7. The conduit string of claim 1 wherein said connector means are each further characterized to include an annular deflector ring means positioned between the sides of said adjacent extending ends of said conductor tubes and said annular insulation means.

8. In an insulated prestressed conduit string for conducting heated fluids through a well bore, said conduit string being comprised of a plurality of concentric double tube conduit sections each including an inner heated fluid conductor tube in tension prestress and a larger diameter outer tube in compression prestress, the improvement which comprises:
   said outer tubes of said conduit sections being shorter than said conductor tubes thereof whereby the ends of said conductor tubes extend short equal distances beyond the ends of said outer tubes;
   bushing means positioned at the ends of said outer tubes and fixedly attached to and between said conductor tubes and said outer tubes; and
   a plurality of connector means connecting said conduit sections together in end-to-end relationship thereby forming said conduit string, each of said connector means comprising:

annular insulation means positioned around axially aligned adjacent extending ends of said conductor tubes and between adjacent bushing means of adjacent conduit sections;

coupling means positioned around said insulation means and connected to the outer tubes of said adjacent conduit sections thereby rigidly connecting said conduit sections together; and seal means positioned between said coupling means and said outer tubes of said adjacent conduit sections thereby forming a sealed heat insulated joint between said adjacent conduit sections.

9. The conduit string of claim 8 wherein each of said conduit sections is further characterized to include one or more annular spacers positioned between said conductor and outer tubes thereof and said bushing means thereof.

10. The conduit string of claim 9 wherein said bushing means of each of said conduit sections are welded to said conductor tube and outer tube thereof and said coupling means are threadedly connected to said outer tubes of said adjacent conduit sections.

11. The conduit string of claim 10 wherein said connector means are each further characterized to include annular deflector ring means positioned between the sides of said adjacent extending ends of said conductor tubes and said annular insulation means.

* * * * *